US006996422B2

(12) United States Patent
Moriki

(10) Patent No.: US 6,996,422 B2
(45) Date of Patent: Feb. 7, 2006

(54) MOBILE TELEPHONE

(75) Inventor: Takashi Moriki, Kanagawa (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 10/116,097

(22) Filed: Apr. 4, 2002

(65) Prior Publication Data
US 2002/0146989 A1    Oct. 10, 2002

(30) Foreign Application Priority Data
Apr. 4, 2001    (JP)    ............................. 2001-105303

(51) Int. Cl.
*H04B 1/38*    (2006.01)
(52) U.S. Cl. ............... 455/566; 455/575.3; 379/433.06
(58) Field of Classification Search ................ 455/566, 455/575.1, 575.3, 550.1; 379/433.01, 433.04, 379/433.06
See application file for complete search history.

(56) References Cited

U.S. PATENT DOCUMENTS

| 5,594,778 | A | | 1/1997 | Schaupp, Jr. et al. |
| 5,903,852 | A | | 5/1999 | Schaupp, Jr. et al. |
| 2002/0032026 | A1 | * | 3/2002 | Montjean ..................... 455/423 |
| 2002/0151283 | A1 | * | 10/2002 | Pallakoff ..................... 455/90 |

FOREIGN PATENT DOCUMENTS

| EP | 1 058 438 A1 | 11/1998 |
| GB | 2 258 984 A | 8/2001 |
| JP | 9-186752 | 7/1997 |
| JP | 9-289685 | 11/1997 |
| JP | 11-112639 | 4/1999 |
| JP | 11-298635 | 10/1999 |
| JP | 11-308317 | 11/1999 |
| JP | 2000-22788 | 1/2000 |
| JP | 2000-22787 | 7/2000 |
| JP | 2000-188629 | 7/2000 |
| JP | 2001-86204 | 3/2001 |

OTHER PUBLICATIONS

Chinese Office Action dated Sep. 12, 2003 together with english language translation.

* cited by examiner

*Primary Examiner*—Lee Nguyen
(74) *Attorney, Agent, or Firm*—Scully, Scott, Murphy & Presse

(57) ABSTRACT

The present invention provides a mobile telephone capable of establishing connection to the Internet or the like only by operating a side key with a simplified connecting operation and reduced time required for connection. A portable telephone as a mobile telephone includes an Internet connecting function, a telephone function, other various functions, a side key provided for a side face of the body to execute a specific function, a display provided for an operation face, and a memory storing information including telephone numbers and URLs. When the side key is depressed long, a controller displays the URLs read from the memory in a list format onto the display and establishes connection to one URL selected from the list by the side key.

9 Claims, 4 Drawing Sheets

MOBILE TELEPHONE

FIELD OF THE INVENTION

The present invention relates to a mobile telephone and, more particularly, to a mobile telephone having an Internet connecting function. The invention also relates to a mobile telephone capable of establishing connection to the Internet only by operating a side key.

BACKGROUND OF THE INVENTION

In recent years, as the functions of a mobile telephone such as a portable telephone or PHS (Personal Handyphone System) increase, connection to the Internet conventionally made by using a computer or a PDA (Personal Digital Assistant) apparatus can be established only by a mobile telephone body. Consequently, by using a mobile telephone, homepages and the like can be browsed from almost any outdoor places in much the same way of making a call.

At present, to connect a portable telephone or the like to the Internet, a procedure of sequentially displaying a plurality of selection screens is taken. A mobile telephone which can be directly connected to the Internet by a single button operation is not seen in the market for the following reason. First, a portable telephone or the like is requested to have a very small size and a light weight of 100 grams or less, so that its surface area is small. Since the small surface of the telephone is already full of a liquid crystal display, keys, switch buttons and the like for telephone use, it is substantially impossible to provide a further key or switch button for functions other than telephone use. The main function of the portable telephone or the like is a telephone function as an inherent object, and the Internet connecting function is placed as one of a number of other functions. Connection to the Internet which has rapidly developed is at a groping stage in various aspects, and the ease-of-use or the like has not been fully examined.

Techniques of achieving various functions by using the limited number of keys and switches (buttons) are disclosed in, for example, Japanese Patent Application Laid-open (JP-A) Nos. 11-298635, 2000-22787, 2000-278385, and 2000-1888629. In JP-A-11-298635, to promptly retrieve and display a specific communication address such as a mail address or URL (Uniform Resource Locator) into a limited display space by a simple operation, personal information is preliminarily registered in a card and updated each use. When the personal information is extracted by the user, the extracted information is displayed on the display screen in accordance with the use frequency so that the user can easily select a desired communication address from the screen.

JP-A-2000-22787 discloses a technique of displaying a general function menu on a display screen, when a ten-key numerical pad is pressed long in such a state, and newly assigning a specific key in the ten-key numerical pad to a desired function or, even when the key has been already assigned, making assignment by overwriting. Consequently, without increasing the number of function keys, a desired function can be called. Similarly, JP-A-2000-278385 discloses a technique of assigning an arbitrary service function to an arbitrary numerical key, and calling the service function assigned to the numerical key by a combination of the key and a specific key.

Further, in JP-A-2000-188629, the user assigns an operation method to a desired key and, to improve ease of operation, an external key is provided. According to the timing of operating the external key or the way of operating the external key, the following operations are performed.

(1) When the external key is depressed during call receiving operation, a call is received.

(2) When the external key is depressed during speech communication, the call is disconnected.

(3) When the external key is depressed long for predetermined time or longer in a standby state, the function set by the user (beeper sound canceling mode, driving mode (mode of transmitting a message that the user is driving), a message taking mode, and the like) is executed. By depressing the external key long, the function set by the user is executed.

However, the conventional mobile telephones disclosed in the above applications intend to deal with the increase in functions, they do not disclose but the technique of facilitating connection to the Internet. The reason for this is that, as described above, it is substantially impossible to provide a further key r switch button for functions other than telephone use. In the future, however, it is certain that importance is attached to the Internet connection function more than the telephone function. It is expected that connection can be established to the Internet by a simple operation (procedure).

SUMMARY OF THE INVENTION

An object of the invention is therefore to provide a mobile telephone which can be connected to the Internet or the like only by operation of a side key, thereby achieving a simpler connecting operation and shortened time required for connection.

According to the invention, to achieve the object, as a first feature, there is provided a mobile telephone including: a telephone function; an Internet connecting function; at least one function other than the telephone function and the Internet connecting function; a side key provided for a side face of a body; a display provided for an operation face; and a memory storing data including a telephone number and Internet connection information, wherein there is provided control means, when the side key is depressed for predetermined time or longer, for displaying the telephone numbers or the Internet connection information read from the memory in a list format onto the display and establishing connection to selected one of the telephone numbers or the Internet connection information in the list by the side key.

According to the configuration, by the control means that the side key is depressed for predetermined time or longer, the telephone numbers or Internet connection information are read from the memory and displayed in a list on the display. When the user selects one of the telephone numbers or Internet connection information from the list, the control means automatically establishes connection to the selected one. Consequently, only by the operation of the side key, connection to the Internet can be established with the minimum number of operation times and minimum required time. Thus, simplified connecting operation, shortened required time, and improved easy of operation can be achieved.

According to the invention, to achieve the object, as a second feature, there is provided a mobile telephone including: a telephone function; an Internet connecting function; at least one function other than the telephone function and the Internet connecting function; a side key provided for a side face of a body; a first display provided for an operation face; a memory storing data including a telephone number and Internet connection information; a body having a foldable structure; and a second display provided for the body of a portion which can be seen from the outside in a state where the body is folded, wherein there is provided control means, when the side key is depressed for predetermined time or longer in a state where the body is in a folded state, for displaying the telephone numbers or the Internet connecting information read from the memory onto the second display and, each time the side key is depressed in such a state, scrolling the display of the telephone numbers or Internet connecting information.

With the configuration, when the control means detects that the side key is depressed long in a state where the body is folded, the telephone number of Internet connection information is read from the memory and displayed in a list onto the second display. Each time the user depresses the side key short, the information is scrolled. Consequently, one of the information in the list can be selected from the list on the display screen. As a result, also in the state where the portable telephone is folded, telephone number or Internet connection information can be recognized and selected and, after that, when the body is unfolded, connection to the Internet or the like can be promptly established.

According to the invention, to achieve the object, as a third feature, there is provided a mobile telephone including: a telephone function; an Internet connecting function; at least one function other than the telephone function and the Internet connecting function; a side key provided for a side face of a body; a first display provided for an operation face; a memory storing data including a telephone number and Internet connection information; a body having a foldable structure; and a second display provided for the body of a portion which can be seen from the outside in a state where the body is folded, wherein there is provided control means, when the side key is depressed for predetermined time or longer in a state where the body is in a folded state, for displaying the telephone number or the Internet connecting information read from the memory onto the second display and, when it is detected that the body is unfolded from the above state, displaying the telephone numbers or Internet connecting information in the format of a list onto the first display, and establishing connection to selected one of the telephone numbers of Internet connection information in the list by the side key.

With the configuration, when the control means detects that the side key is depressed long in a state where the body is folded, the telephone number of Internet connection information is read from the memory and displayed in a list onto the second display. When the user selects one of the information in the list on the display screen, connection is automatically established to the selected destination. Therefore, only by the operation of the side key, the connecting operation can be started from the state where the body is folded, connection to the Internet or the like can be established with the minimum number of operation times and minimum required time. Thus, simplified connecting operation, shortened required time, and improved ease of operation can be realized.

DETAILED DESCRIPTION OF THE PREFERRED EMBODIMENTS

Embodiments of the invention will be described hereinbelow with reference to the drawings.

First Embodiment

Figure 1:
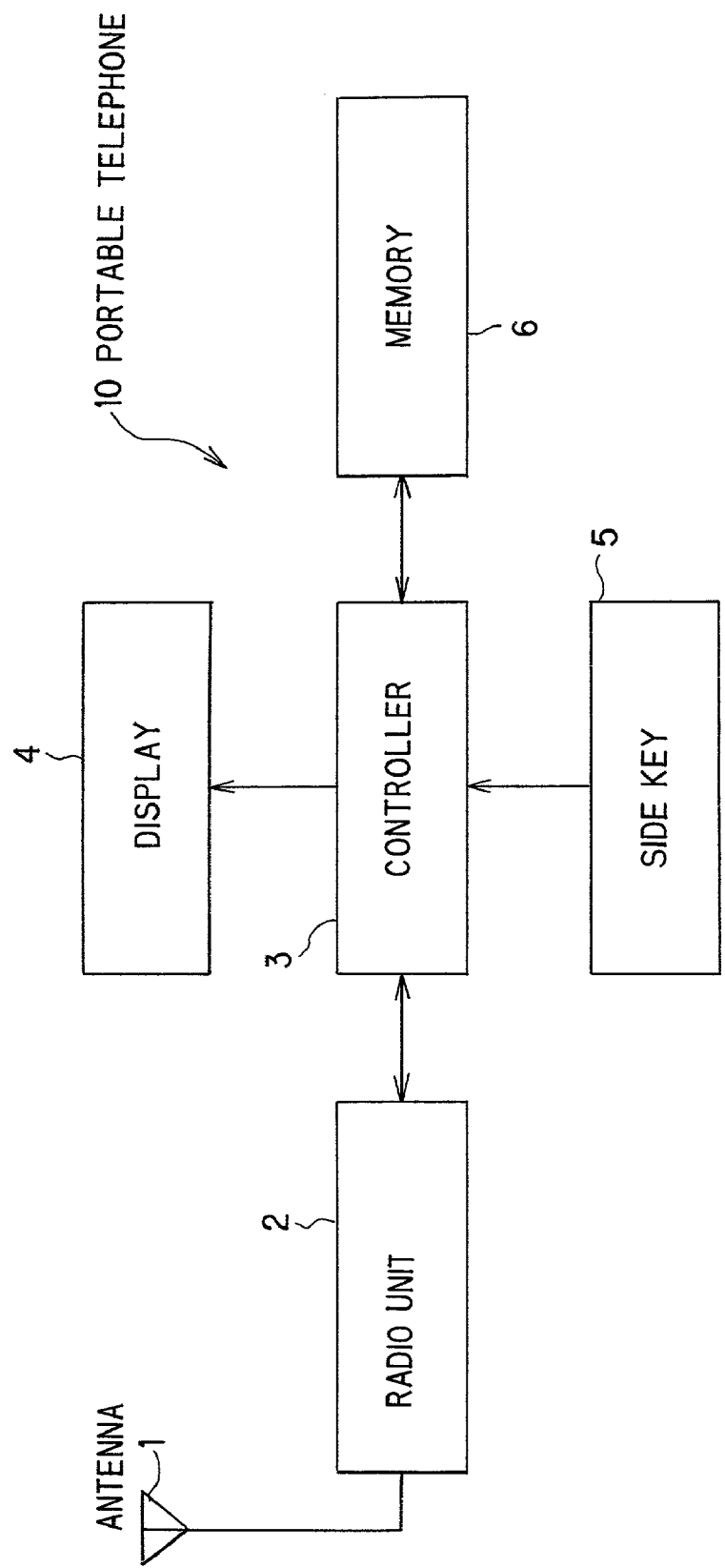
FIG. 1 is a block diagram showing the configuration of a mobile telephone according to the invention.

FIG. 1 shows the configuration of a mobile telephone according to the invention. In the following, a case of using a portable telephone as a mobile telephone will be described.

A portable telephone 10 includes an antenna 1, a radio unit 2, a controller 3, a display 4, a side key 5, and a memory 6. The antenna 1 is used for radiation (transmission) and reception of radio waves. The radio unit 2 is connected to the antenna 1 and the controller 3 and performs transmission/reception (communication) under control of the controller 3. The radio unit 2 includes a transmission circuit and a reception circuit. The controller 3 is constructed by using a CPU and executes a control on the whole telephone and a control on connection to the Internet. As the display 4, a liquid crystal display capable of displaying characters of at least a few lines. The display 4 is connected to the controller 3 and displays various data (telephone number, operations, settings, actions, and the like).

Figure 2:
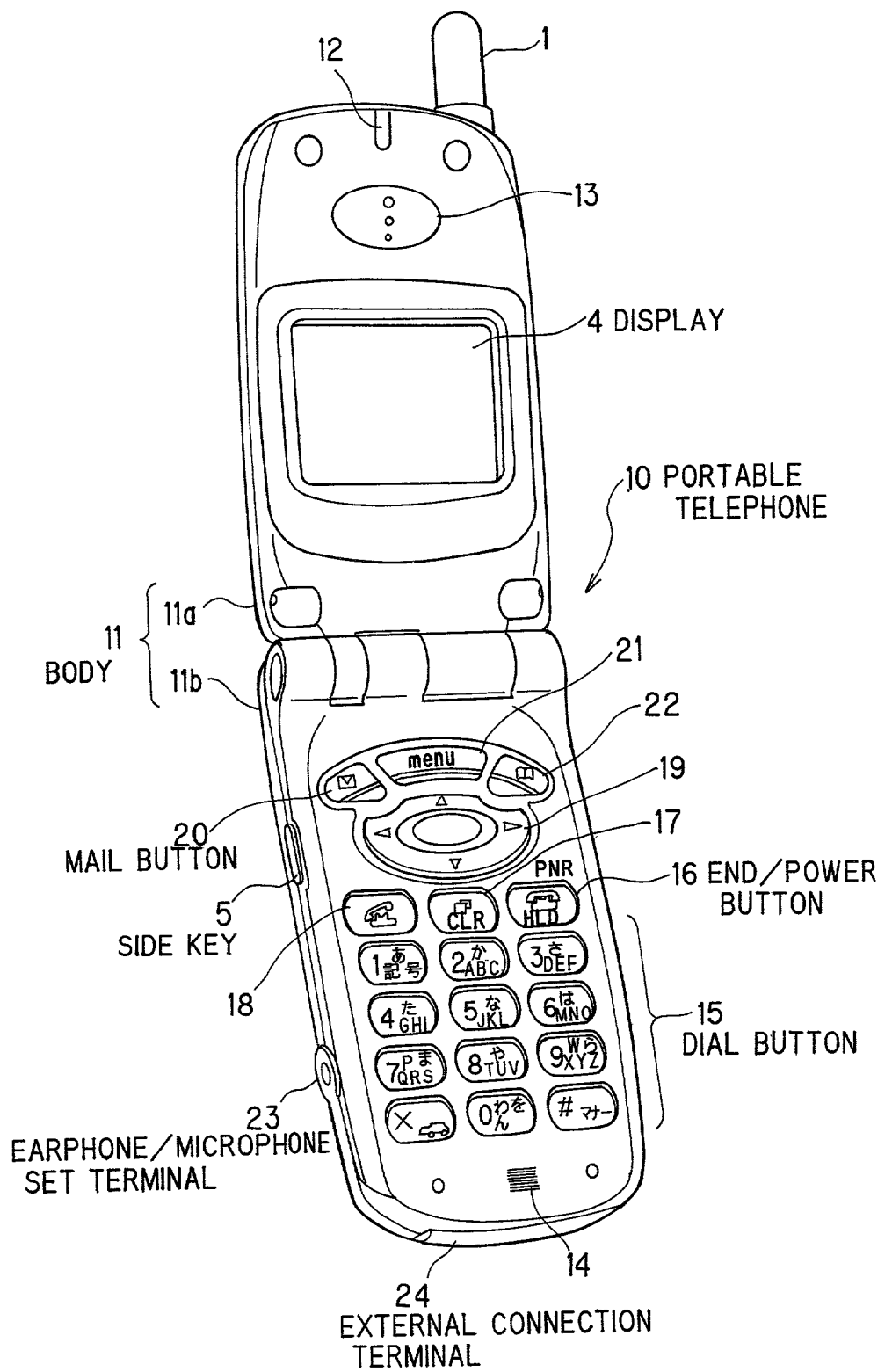
FIG. 2 is a perspective view showing the appearance of the mobile telephone of FIG. 1.

The side key 5 takes the form of a push button which is provided in a portion in a side face of the body, where it is easily operated by a finger. The side key 5 is connected to the controller 3 in the circuit. The side key 5 executes a plurality of operations in accordance with depress states. When the side key 5 is depressed for short time, a memo function is executed. When the body is folded as shown in FIG. 2, by depression of short time (for example, less than one second), whether the telephone is in the coverage or not can be checked according to the on-state or flashing state of a call receiving lamp. By depression of long time (for example, one second or longer), an Internet connection process can be performed. The memory 6 is connected to the controller 3 and is used for storing personal information such as telephone number, settings made by the user, and the like.

FIG. 2 shows the appearance of the portable telephone 10. The body 11 of the portable telephone 10 has a foldable structure. The body 11 is obtained by connecting an upper-half body 11a and a lower-half body 11b to each other so as to be able to swing. When the body 11 is folded, the length is about the half of that of the body 11 which is unfolded. The extendable antenna (telescopic antenna) 1 and a call reception/charging lamp 12 constructed by an LED are provided at the upper end portion of the upper-half body 11a. Further, the display 4 and a receiver 13 are provided in predetermined positions in the surface.

In the surface of the lower-half body 11b, a transmitter (microphone) 14, dial buttons (ten keys and sign keys) 15, an end/power button 16, a re-dial (/clear) button 17, a start button 18, a controller 19, a mail button 20, a menu button 21, and a telephone book button 22 are provided. Further, in a side face of the lower-half body 11b, the side key 5, an earphone/microphone set terminal 23, and an external connection terminal 24 are provided. Like the side key 5, all of the buttons provided for the upper-half body 11a and lower-half body 11b are connected to the controller 3.

In FIG. 2, when the end/power button 16 is depressed long, the controller 3 detects this operation and turns on the power of the portable telephone 10. By the turn-on, date, time, and the like are displayed in the display 4, and the telephone is set in a standby state. To turn off the power of the portable telephone 10, it is sufficient to depress the end/power button 16 long in a state where the power is on. When a call is received in the standby state, the controller 3 allows the reception/charging lamp 12 to flash and allows a beeper sound to be output from a speaker (not shown). When the start button 18 is depressed for response, connection is made to a base station via the antenna 1 and the radio unit 2, and speech communication is started.

In the case of making a call, the ten keys of the dial buttons 15 are operated to enter a telephone number or a calling is made by using a telephone book function. When the start button 18 is depressed in such a state, the controller 3 controls the radio unit 2 to establish a connection to the base station, and calls the other party. In the case of using the telephone book function, by depressing the telephone book button 22 to receive the number, the applicable telephone number is read out from the memory 6 and displayed in the display 4. When the start button 18 is depressed, calling is started.

In the case of charging a lithium cell loaded in the lower-half body 11b, the cover of the external connection terminal 24 is opened and a connector of a charging adapter (not shown) is connected to the external connection terminal 24. Further, in the case of making a call in a car, an earphone and microphone set is connected to the earphone/microphone set terminal 23. In the case of sending a mail, the main button 20 is depressed to perform communication by a predetermined method.

Figure 3:
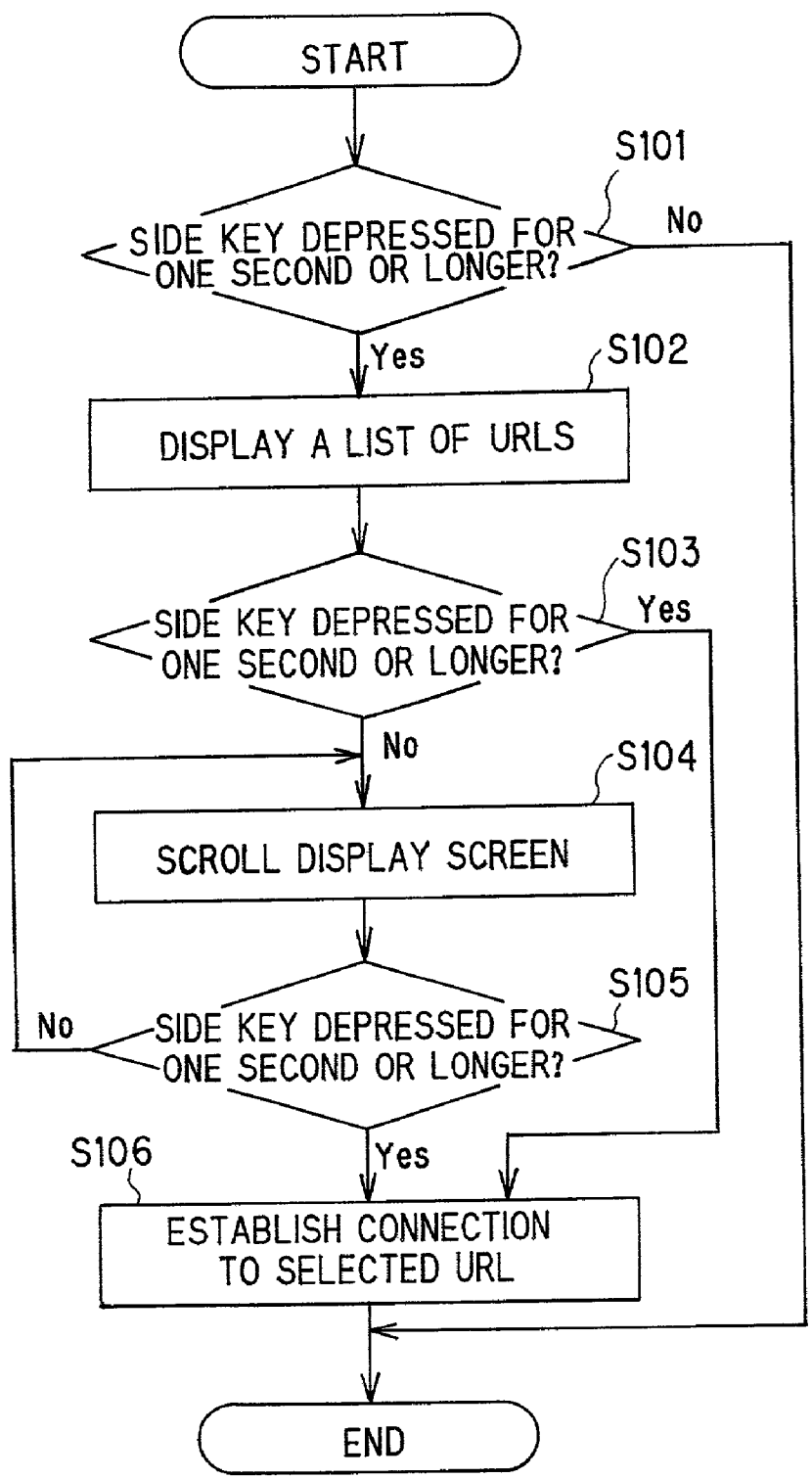
FIG. 3 is a flowchart showing an Internet connecting process in the mobile telephone of the invention.

FIG. 3 is a diagram for explaining a process performed in the case of connecting the telephone to the Internet. "S" in the diagram denotes step.

The process is executed by the controller 3. The outline of the process will now be described. When the side key 5 is pressed long, URLs registered in the memory 6 are displayed in the display 4, forming as a list. When a URL designated is designated on the display screen, or the other URLs are scrolled and a desired URL is designated, and the side key 5 is depressed again long to determine the URL, the telephone is automatically connected to a designated URL site. Detailed description will be given hereinbelow with reference to FIGS. 1 to 3.

When the side key 5 is depressed for one second or longer (S101), a list of URLs stored in the memory 6 is displayed on the display 4 (S102). When the side key 5 is depressed normally less than one second, the process is finished (END) and another process is executed. At the time of displaying the list of URLs, the URLs are always updated and displayed in accordance with the use frequency, so that a URL is promptly selected. In the initial screen displaying the list, the uppermost URL is designated in reverse video. If this URL is the one desired by the user, by depressing the side key 5 again (S103), the URL is determined and line connection is started (S106). If the uppermost URL in reverse video is not a URL desired, the side key 5 is depressed short (less than one second) (or the controller 19 is operated) so as to scroll the URLs. An arbitrary URL in the list can be selected. Each time a URL is selected, the URL is displayed in reverse video (S104). When the side key 5 is depressed long on selection of the URL (S105), the URL presently displayed in reverse video is determined as an object to be connected, and connection to the URL is started (S106).

As described above, according to the invention, only by depressing the side key 5, a URL can be selected and determined. In association with the operation, connection is automatically established. Consequently, at the time of connection to the Internet, the number of depressing times of the buttons by the user can be decreased. At the time of connection to the Internet, conventionally, one of URLs of sites registered in the memory is determined through a few selection screens. In contrast, according to the present invention, a registered site can be retrieved and connected only by the side key, so that the user operation is simplified and the time to the connection can be shortened.

Second Embodiment

Figure 4:
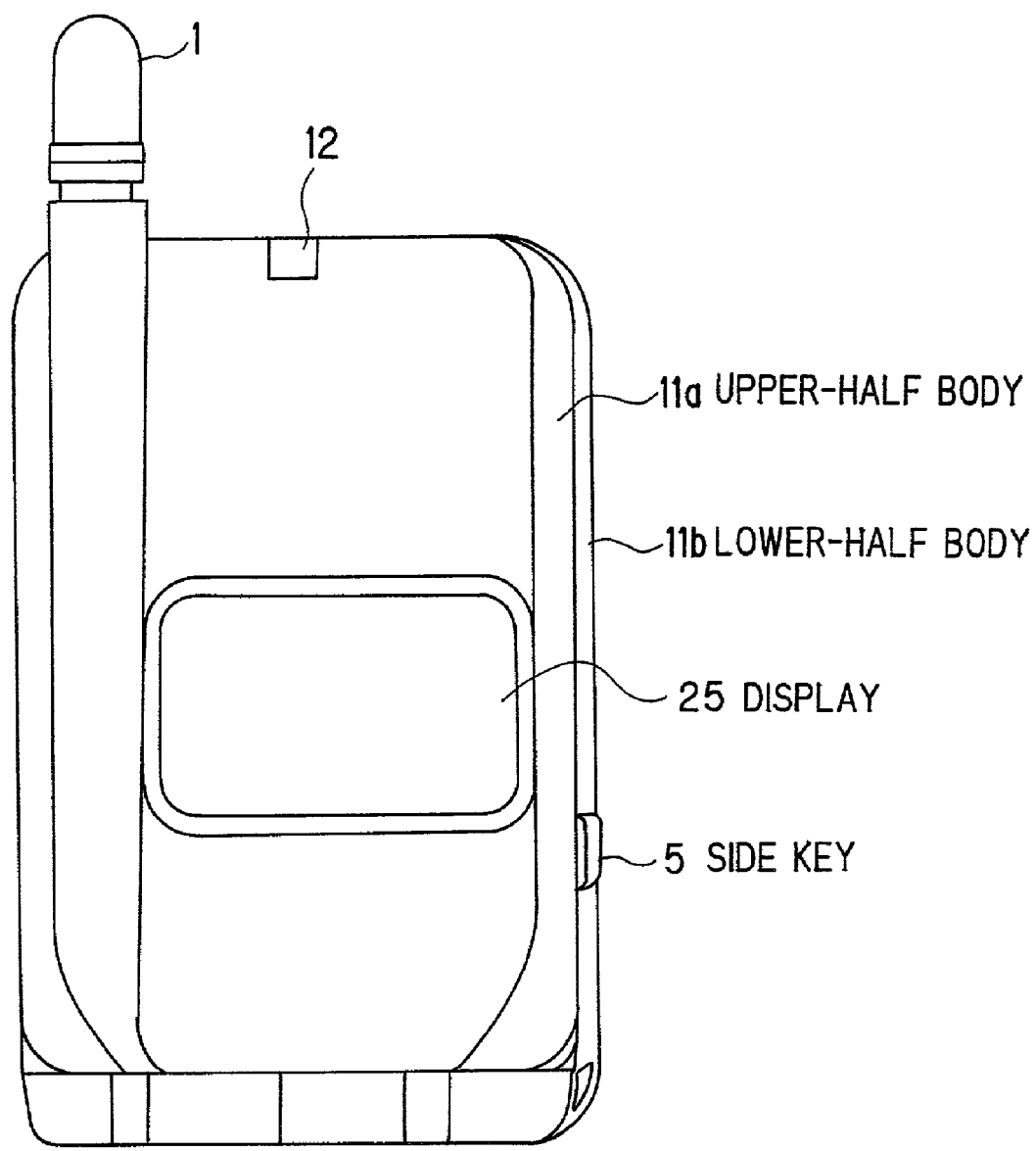
FIG. 4 is a perspective view showing the rear face and a side face of the upper-half body in a state where the portable telephone of FIG. 1 is folded.

FIG. 4 shows a second embodiment of the invention.

FIG. 4 shows the rear face of the upper-half body 11a in a state where the portable telephone 10 of FIG. 1 is folded. In the rear face, a second display 25 is provided. Desirably, the display 25 has a display size which is about the same as that of the display 4. The display 25 has to display at least one line in the list of URLS. The processes in the embodiment are the same as those of FIG. 3 except that data is displayed on the display 25 in place of the display 4.

In FIG. 4, when the side key 5 is depressed long (one second or longer in this case) in a state where the portable telephone 10 is folded, a list of URLs stored in the memory 6 is displayed on the display 25 (S102). When one of the URLs is selected by scrolling performed by depressing the side key 5 (S103 to S105), the URL is displayed in reverse video. After unfolding the body 11 from the state, the side key 5 is depressed long ("Yes" in S103 or S105), thereby determining the URL displayed in reverse video as an object of connection, and connection to the URL is started (S106).

According to the second embodiment, even in the state where the portable telephone 10 is folded, a URL can be recognized and selected. By unfolding the body 11 after that, the telephone can be connected to the Internet promptly.

Third Embodiment

A third embodiment of the invention will now be described. In FIG. 4, when the side key 5 is depressed long in a state where the portable telephone 10 is folded, the operation of S102 in FIG. 3 is executed and a list of URLs is displayed. In this state, when the folded portable telephone 10 is unfolded as shown in FIG. 2 into a use state, the operation is detected by the controller 3 (for example, by a switch which operates interlockingly with the unfolding operation), and a list of URLs is displayed on the display 4 in place of the display 25 (or on both of the displays 4 and 25). When the side key 5 is operated in this state, the process in S103 or S105 and subsequent processes in FIG. 3 can be executed to start connection of a URL selected by the process in S103 or S105 (S106).

According to the third embodiment, in the state where the portable telephone 10 is folded, an Internet connection mode can be recognized. By unfolding the portable telephone 10, connection to the URL can be executed. Consequently, in the case where the displayable area of the display 25 is smaller than that of the display 4, even when the number of URLs used is large, a URL can be selected promptly by using the display 4 of a large display area.

Fourth Embodiment

In a fourth embodiment, the display 25 is not provided in the portable telephone 10 in FIG. 4. Therefore, a configuration similar to that of the third embodiment except that data is not displayed on the display 25 is provided. In this configuration, the side key 5 is pressed long in a state where the portable telephone 10 is folded and, after that, the portable telephone 10 is unfolded so as to enter a use state. When the unfolding operation is detected, a list of URLs is displayed on the display 4. In this case, the list of URLs may be displayed on the display 4 irrespective of whether the body 11 is unfolded or not. However, in the case where the side key 5 is depressed long but remains folded, data is uselessly displayed on the display 4, and battery usable time is shortened due to the wasted power. When the side key 5 is depressed long in a state where the list of URLs is displayed on the display 4, the process of S103 and subsequent processes in FIG. 3 can be executed, and connection to the URL selected in S103 or S105 is started.

According to the fourth embodiment, by performing the operation of unfolding the portable telephone 10 while depressing the side key 5, a state where the list of URLs is displayed on the display 4 can be obtained. Therefore, the Internet connection mode can be executed promptly.

In each of the foregoing embodiments, URLs are read by depressing the side key 5 long. Instead, other information recorded in the memory 6, concretely, telephone numbers, mail addresses, or the like may be retrieved (read).

Although the side key 5 is used for connection to the Internet in the foregoing embodiments, as long as a mounting space can be assured, a dedicated key may be provided and used instead of the side key 5. Alternately, another key may be used in place of the side key 5. For example, a configuration of using a key provided for the rear face for another function may be employed.

Further, although the side key 5 is used for both the Internet connecting function and another function, the side key 5 may be dedicated to the connection to the Internet. Although the side key 5 is a push button in the above description, it may be a slide switch (or slide key) or rotatable switch.

As obviously understood from the above, according to the first mobile telephone of the invention, there is provided the control means for, when it is detected that the side key is depressed for predetermined time or longer, reading the telephone numbers or Internet connection information from the memory, displaying them in a list on the display and automatically establishing connection to the selected one. Consequently, only by the operation of the side key, connection to the Internet can be established with the minimum number of operation times and minimum required time. Thus, simplified connecting operation, shortened required time, and improved easy of operation can be achieved.

According to the second mobile telephone of the invention, the control means is provided for, when the control means detects that the side key is depressed long in a state where the body is folded, reading the telephone number of Internet connection information from the memory, displaying them in a list onto the second display, each time the side key is depressed short, scrolling the information, and selecting one of the information in the list. As a result, also in the state where the portable telephone is folded, telephone number or Internet connection information can be recognized and selected and, after that, when the body is unfolded, connection to the Internet or the like can be promptly established.

According to the third mobile telephone of the invention, the control means is provided for, when it is detected that the side key is depressed long in a state where the body is folded, reading the telephone number of Internet connection information from the memory, displaying them in a list onto the second display, and automatically establishing connection to the selected one of the information in the list on the display screen. Therefore, only by the operation of the side key, the connecting operation can be started from the state where the body is folded, connection to the Internet or the like can be established with the minimum number of operation times and minimum required time. Thus, simplified connecting operation, shortened required time, and improved ease of operation can be realized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A mobile telephone comprising:
 a telephone function;
 an Internet connecting function;
 at least one function other than the telephone function and the Internet connecting function;
 a side key provided for a side face of a body of said mobile telephone;
 a display provided for an operation face of the body; and
 a memory storing data including a telephone number and Internet connection information,
 wherein there is provided control means, when said side key is depressed for a predetermined time or longer, for displaying said telephone numbers or said Internet connection information read from said memory in a list format onto said display and establishing connection to selected one of said telephone number and said Internet connection information in said list by said side key.

2. The mobile telephone according to claim 1, wherein when said body has a foldable structure and said side key is depressed for the predetermined time or longer in a state where said body is folded, said control means displays the list on a second display.

3. The mobile telephone according to claim 1 or 2, wherein said Internet connection information is a URL (Uniform Resource Locator).

4. The mobile telephone according to claim 1, wherein said side key is also used to execute another function.

5. A mobile telephone comprising:
 a telephone function;
 an Internet connecting function;
 at least one function other than the telephone function and the Internet connecting function;
 a side key provided for a side face of a body;
 a first display provided for an operation face;
 a memory storing data including a telephone number and Internet connection information;
 a body having a foldable structure; and
 a second display provided for said body of a portion which can be seen from the outside in a state where said body is folded,
 wherein there is provided control means, when said side key is depressed for predetermined time or longer in a state where said body is in a folded state, for displaying said telephone numbers or said Internet connecting information read from said memory onto said second display and, each time said side key is depressed in such a state, scrolling the display of said telephone numbers or Internet connecting information.

6. The mobile telephone according to claim 5, wherein when said control means detects that said body is unfolded from a folded state, said control means establishes connection to said telephone number of Internet connection information designated by depressing said side key for predetermined time or longer.

7. The mobile telephone according to claim 5, wherein said Internet connection information is a URL (Uniform Resource Locator).

8. A mobile telephone comprising:
a telephone function;
an Internet connecting function;
at least one function other than the telephone function and the Internet connecting function;
a side key provided for a side face of a body;
a first display provided for an operation face;
a memory storing data including a telephone number and Internet connection information;
a body having a foldable structure; and
a second display provided for said body of a portion which can be seen from the outside in a state where said body is folded,
wherein there is provided control means, when said side key is depressed for predetermined time or longer in a state where said body is in a folded state, for displaying said telephone number or said Internet connecting information read from said memory onto said second display and, when it is detected that said body is unfolded from the above state, displaying said telephone numbers or Internet connecting information in the format of a list onto said first display, and establishing connection to selected one of said telephone numbers of Internet connection information in said list by said side key.

9. The mobile telephone according to claim 8, wherein said Internet connection information is a URL (Uniform Resource Locator).

* * * * *